US008346675B2

(12) United States Patent
Boerkei et al.

(10) Patent No.: US 8,346,675 B2
(45) Date of Patent: Jan. 1, 2013

(54) ADAPTIVE INFORMATION AND MEASUREMENT SYSTEM

(75) Inventors: Marcus Boerkei, Mansfield, TX (US); Michael D. Carpenter, Arlington, TX (US); Dale E. Redford, Grand Prairie, TX (US); Floyd W. Worth, II, Richardson, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 304 days.

(21) Appl. No.: 12/490,825

(22) Filed: Jun. 24, 2009

(65) Prior Publication Data
US 2009/0313068 A1    Dec. 17, 2009

Related U.S. Application Data

(63) Continuation-in-part of application No. 11/840,749, filed on Aug. 17, 2007, now Pat. No. 8,024,063.

(60) Provisional application No. 61/075,423, filed on Jun. 25, 2008, provisional application No. 61/079,281, filed on Jul. 9, 2008.

(51) Int. Cl.
*G06Q 30/00* (2012.01)

(52) U.S. Cl. ........ 705/333; 705/401; 705/337; 705/330; 235/385; 382/101; 700/225; 700/226; 700/227

(58) Field of Classification Search .............. 705/4 X X, 705/3 X X, 28; 235/385; 382/101
See application file for complete search history.

(56) References Cited

U.S. PATENT DOCUMENTS

| | | | |
|---|---|---|---|
| 4,796,180 A * | 1/1989 | Riley | 705/7.37 |
| 5,043,908 A * | 8/1991 | Manduley et al. | 700/227 |
| 6,557,755 B1 * | 5/2003 | Pickering et al. | 235/376 |
| 6,634,551 B2 * | 10/2003 | Barta et al. | 235/385 |
| 6,816,602 B2 * | 11/2004 | Coffelt et al. | 382/101 |
| 7,079,981 B2 | 7/2006 | Keller et al. | |
| 2002/0123943 A1 * | 9/2002 | Gupta et al. | 705/28 |
| 2002/0138173 A1 * | 9/2002 | Barta et al. | 700/225 |
| 2002/0165729 A1 * | 11/2002 | Kuebert et al. | 705/1 |
| 2003/0171946 A1 * | 9/2003 | Kelly | 705/1 |
| 2003/0208370 A1 * | 11/2003 | Wilson et al. | 705/1 |
| 2004/0093312 A1 * | 5/2004 | Cordery et al. | 705/401 |
| 2004/0128207 A1 * | 7/2004 | Ray | 705/26 |
| 2004/0188522 A1 * | 9/2004 | Ashaari | 235/385 |
| 2004/0243452 A1 * | 12/2004 | Barton et al. | 705/7 |
| 2004/0264739 A1 * | 12/2004 | Das et al. | 382/101 |
| 2005/0006470 A1 * | 1/2005 | Mrozik et al. | 235/385 |
| 2005/0031162 A1 | 2/2005 | Sagi et al. | |
| 2005/0182600 A1 * | 8/2005 | Keller et al. | 702/188 |
| 2005/0197974 A1 * | 9/2005 | Schenck et al. | 705/401 |
| 2006/0122851 A1 * | 6/2006 | Ryan, Jr. | 705/1 |
| 2006/0219601 A1 | 10/2006 | Babanats et al. | |
| 2006/0229895 A1 * | 10/2006 | Kodger, Jr. | 705/1 |
| 2006/0235710 A1 * | 10/2006 | Hodess et al. | 705/1 |

(Continued)

FOREIGN PATENT DOCUMENTS

EP        1345181 A2       9/2003
(Continued)

*Primary Examiner* — John Hayes
*Assistant Examiner* — Brian Epstein (57) ABSTRACT

A method, AND apparatus are described to accurately measure the delivery performance of a postal service using without external agents in the measurement process. The invention describes a system that measures the postal logistic automatically, and continuously. The basis for measurement are tag mail pieces that circulate continuously through the postal system.

12 Claims, 5 Drawing Sheets

U.S. PATENT DOCUMENTS

| | | | |
|---|---|---|---|
| 2006/0282277 A1* | 12/2006 | Ng ........................................ | 705/1 |
| 2007/0078793 A1* | 4/2007 | Dearing et al. ............... | 705/401 |
| 2008/0000977 A1 | 1/2008 | Sharghi | |
| 2008/0311550 A1* | 12/2008 | Giambrone et al. .......... | 434/353 |

FOREIGN PATENT DOCUMENTS

| | | |
|---|---|---|
| EP | 1560166 A2 | 3/2005 |
| WO | 2005003926 A2 | 1/2005 |
| WO | 2005026875 A2 | 3/2005 |

* cited by examiner

ADAPTIVE INFORMATION AND MEASUREMENT SYSTEM

This application claims priority of U.S. provisional application No. 61/075,423, filed Jun. 25, 2008 and of U.S. provisional application No. 61/079,281, filed Jul. 9, 2008. This application is a continuation-in-part of commonly assigned Ser. No. 11/840,749, filed Aug. 17, 2007.

FIELD OF THE INVENTION

The invention relates to a system for performance evaluation, especially as applied to a postal service.

BACKGROUND OF THE INVENTION

The determination of service performance for a postal agency is an important aspect of refining the reputation and value of delivery services, as well as identifying and troubleshooting problems within the delivery logistic. Postal services have traditionally measured their service performance externally by means of static delivery points to which the postal service delivers test letters that have been intentionally seeded into the mail stream at prescribed locations and times. Testing agents at the fixed points to which the test letters are delivered record time of delivery information, and data from all the agents is regularly aggregated as the basis for performance reports.

These systems tend to be very expensive, which leads to a narrow sampling methodology. Over time, the Sectional Center Facility (SCF) within which data collection agents operate become known which makes the system produce data which is not representative of the rest of the system. In the ideal system, postal workers would not know in advance where measurement is taking place.

With the advent of computer-controlled, dynamic sortation, unique "license plate" bar codes used in postal systems, and handheld scanning computers used by postal delivery personnel, it is possible to design a system through which a broader range of precise, representative performance can be measured. Such a system would be not only more accurate and informative than the traditional system, but it is also less expensive to operate.

U.S. Pat. No. 7,079,981 describes a method of analyzing the operation of a delivery system. The method includes: determining a seeding plan; placing a seed piece into the delivery system; tracking the seed piece through the delivery system to generate tracking data; storing the tracking data in a central repository; and analyzing the tracking data to determine one or more faults. The faults referred to are sortation faults generated by the mail sorting facility.

SUMMARY OF THE INVENTION

The present invention describes a method, apparatus and process to accurately measure the delivery performance of a postal service without using external agents in the measurement process. The invention describes a system that can measure the postal logistic automatically, and preferably continuously. The basis for measurement are tag mail pieces that circulate through the postal system.

According to one aspect of the invention, a method for tracking postal service performance uses a computerized tracking system and tag mail pieces having machine readable indicia indicating an identification code for each tag. The method includes an initial step of assigning delivery destinations to each tag mail piece using the system. At an originating postal facility, the tag mail pieces are sorted on postal mail sorting machines according to a sort scheme whereby the tag mail pieces are each grouped with mail addressed to the delivery destination assigned to the grouped tag mail piece. The groups of mail grouped with tag mail pieces are transported to a destinating postal facility. The tag mail pieces are scanned to determine date and time of arrival of each at a series of locations at which the scans are made, which scanning is carried out at multiple locations to determine transit times between locations for each tag, wherein the locations preferably include originating postal facility, the destinating postal facility, and the delivery destinations. The tags are returned from the delivery destinations to an originating postal facility which may be the same or different from the originating postal facility it started from. Tag arrival data is analyzed using the system which is programmed to identify tag arrival data associated with postal performance problems. In such a method the steps are preferably repeated in a cycle wherein tags scanned at delivery destinations at the end of one cycle and the start of the next are returned to the originating postal facility. The method is highly useful when conducted on a pair of first and second mail facilities at different geographic locations, wherein the first mail facility serves as originating mail facility for mail and tags transported to the second mail facility as destinating mail facility, and the second mail facility serves as originating mail facility for mail and tags transported to the first mail facility as destinating mail facility.

The invention further provides a system for tracking postal service performance. Such a system includes a plurality of tag mail pieces each bearing a machine readable identification code, a computerized tracking system that maintains a database of tracking data which reflects when each tag was scanned during a postal delivery cycle, which tracking system receives tracking data from postal mail sorting machines which scan the tag mail pieces and from manual scanning devices used to scan the tag mail pieces during postal delivery, a communications system such as a network whereby the tracking system receives tracking data from a plurality of postal sorting machines and manual scanning devices, and an automated analyzer that identifies tag arrival data associated with postal performance problems. The invention further provides a set of tag mail pieces for use in the foregoing method and system each comprising a mail piece sized card having a unique machine scannable identification code thereon.

These and other aspects of the invention are described further in the detailed description that follows. For purposes of the invention, the word "carrier" refers to the human worker that delivers sorted mail to delivery points such as homes and businesses. A "destination code" as referred to herein is a code such as a zip code which defines a system of zones to which mail is delivered. "Tracking data" according to the invention refers to data saved in a database which reflects the tag mail piece identity, the date, and time, as well as the location where a scan of a tag mail piece was made during a postal delivery process. It is to be understood that terms used herein not otherwise defined should be given their meanings recognized in the postal sorting art, if applicable, not more general definitions found in dictionaries.

DETAILED DESCRIPTION

Figure 1:
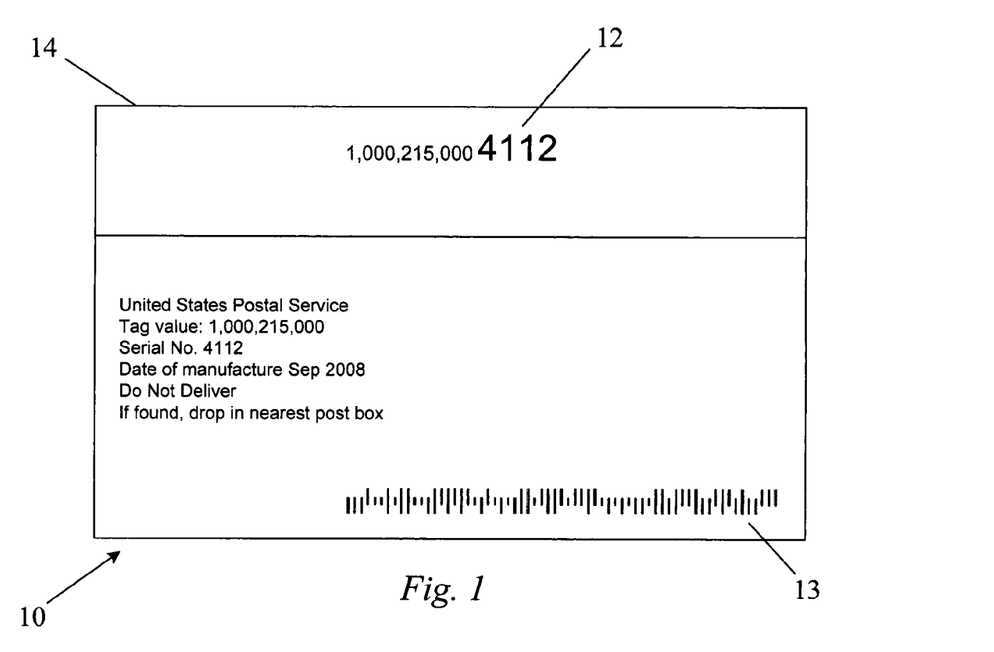
FIG. 1 is a front view of a tag according to the invention.

An example tag or marker is shown in FIG. 1. This tag concept is adapted from commonly-assigned Redford et al. Process And System For Tracking of Mail, U.S. Ser. No. 11/840,749, filed Aug. 17, 2007, U.S. patent publication 20090048704, Feb. 19, 2009, the contents of which are incorporated by reference herein. Tags (tag mail pieces) 10 are added to a stream of mail being processed on a sorter. These special tags 10 resemble mail pieces, but use of actual mail pieces as markers is not preferred. The RFID tag described in Redford et al. referenced above may be omitted. Tag 10 has a unique human-readable ID number (including a tag number and serial number) 12 and a printed unique bar code 13. Tag 10 is preferably at the maximum permitted height of a letter mail piece, 6⅛ inches, with a human readable serial number printed at the top, and may be color differentiated such as by a horizontal stripe 14 across the top wherein the number 12 is printed. In general, a tag 10 in a tray should be easily identified visually because not many mail pieces of the type sorted on postal letter sorting machines are over 5 inches tall. Tag 10 also has a scannable ID code such as an intelligent mail bar code (IMB) 13. This allows the computer controlling operation of the sorting machine to identify the tag number 12 of tag 10 as it passes. A "unique" code for purposes of the invention is one that is different from the codes for all other items of the same type within the system in which the item (such as a tag 10 is used).

Redford et al. starts with the method by which the tags are introduced and are persistent within the system. Rather than introducing the tags manually or automatically at the outset of an operation, the present invention initially introduces a relatively large batch of tags into convenient points within the overall logistic, such as the dual-pass rough cull system, also known as the "Barney." The system of the invention takes over the routing of tags from that point, distributing and positioning an adequate number of tags throughout the postal logistic at appropriate measurement points at the appropriate moment to make relevant measurements.

Service measurements for first class mail are taken in "loops" through the system that start and finish with the human postal carrier. This represents the performance of the postal service according to the factors under the control of the postal service. For instance, the failure of a patron to go to the mailbox and retrieve their mail is not a component of the measurement. The event which frames the end of one loop and the start of the next is the carrier's scanning of the Intelligent Mail Barcode (IMB) of the distinctive tag mail pieces, which are intermingled with sequenced mail at profoundly low rates. When the carrier sees the tag mail piece in the course of the route, the carrier scans the tag mail piece and puts it with the outgoing mail that is being collected. The tag mail piece is at that moment concluding its previous delivery cycle and embarking on the next one.

Figure 2:
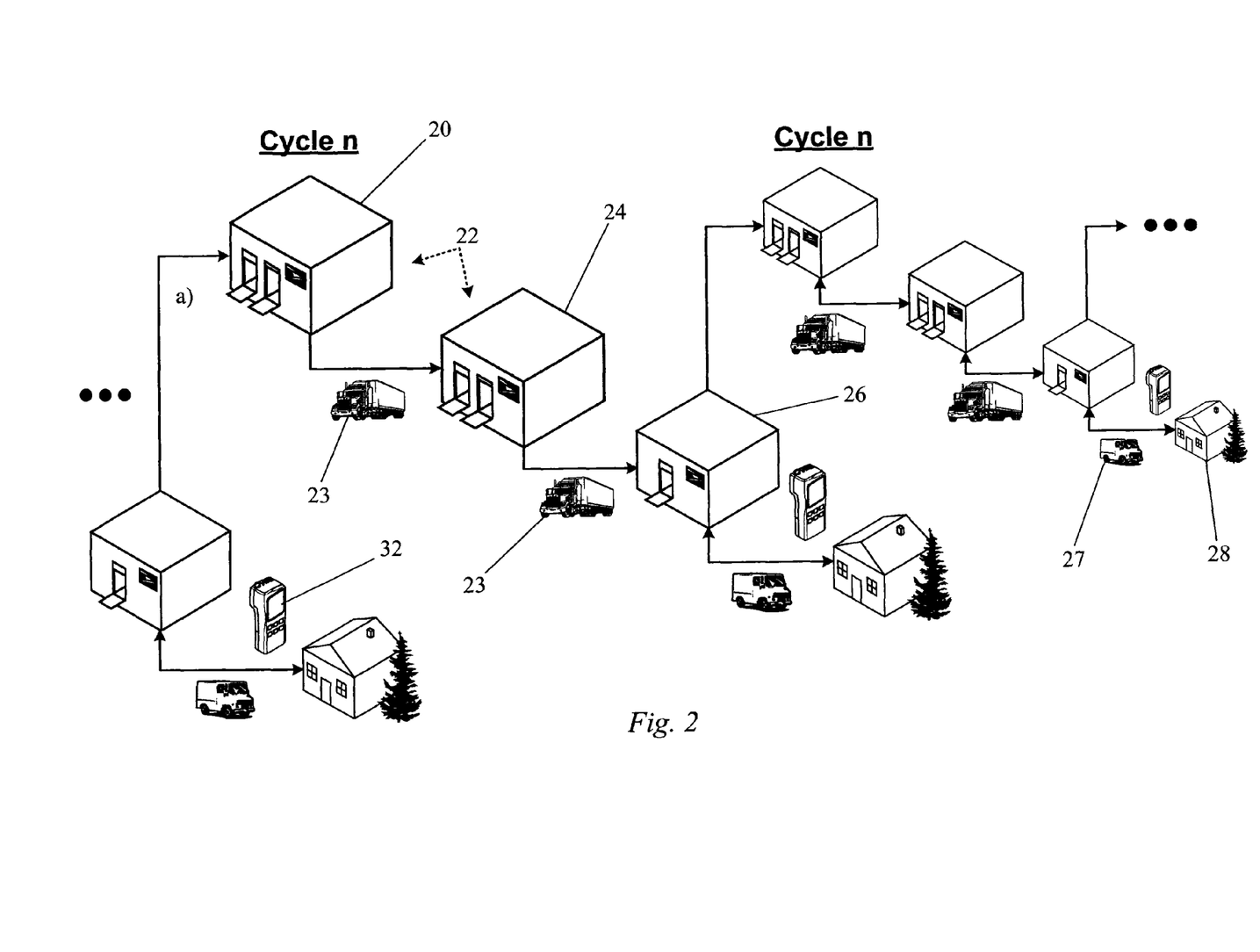
FIG. 2 is a schematic diagram of circulation of tag mail pieces within the postal logistic according to the invention.

FIG. 2 shows the sequential looping of tags whose journeys are framed by the carrier scan during delivery/collection. The cycle begins at the destinating processing and distribution center (P&DC) 20. There are intermediate scans at automation or manual sorting points 22 that provide the salient points that describe the process sequence routing. This information is needed in troubleshooting basic service level problems. It is possible to utilize any of the salient mail processing equipment scan points to "start" and "stop the clock," in the sense that the total time in a delivery cycle could be estimated based on the summation of different time segments between measurements that the tag 10 is present. Preferably each tag 10 at P&DC 20 is designated for delivery to an address not served by the P&C 20, but to one served by a destinating P&DC 24 which serves a different range of addresses (destinations). Destinating P&DC 24 is at a different geographic location so that mail from originating P&DC 20 is shipped there, generally in trucks 23.

Once the incoming mail and tags 10 that accompany the mail are sorted at P&DC 24, so that a relatively small number of batches of mail intended for delivery by a designated carrier have a tag 10 in addition to the presorted mail. The postal carrier 27 in the course of a delivery route to a recipient at the delivery point 28 finds a tag 10 and at that moment (ideally) the tag is scanned without being delivered and instead returned to the delivery unit 26. The scan that takes place at the delivery point 28 ends the current measurement cycle and starts the next.

Figure 3:
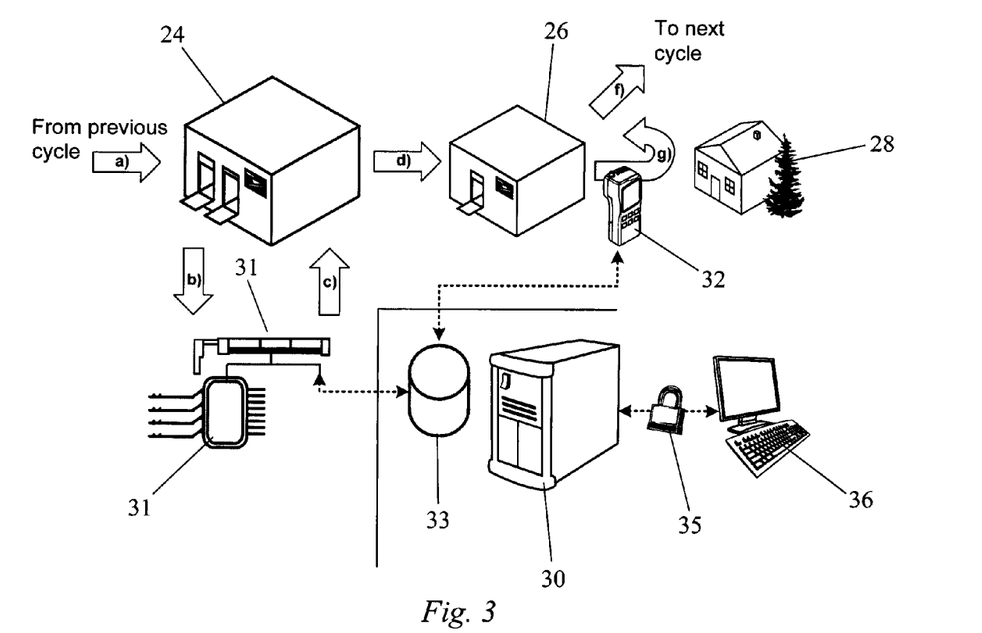
FIG. 3 is a schematic diagram of system server operation according to the invention.

As shown in FIG. 3, a system server 30 collects scan information as the tag mail pieces are processed by the various mail processing equipment 31, and importantly, by the carrier through the intelligent mail device (IMD) 32. The IMD 32 is a hand held scanner with memory that retains the result of each scan, namely the scan time and tag I.D. number. The information from IMD 32 is uploaded daily when the carrier returns to the office (DU 26), and is then routed to a database 33 accessed by the system server 30. Database 33 stores data from system 30 relating to route generation, scan logging, report generation and tag management. System 30 analyzes scan points to detect problematic scan habits by the carrier, such as scanning all of the tag mail pieces upon return to the office as indicated by closely spaced sequential time stamps, failure to scan the tags, and missing tag mail pieces. In instances such as these, an alert would be generated to inform the manager of Delivery Unit (DU) 26 of the problem. For all scans, either through mail processing equipment 31 or an IMD 32, the system 30 verifies the consistency and validity of the scan logs, and can identify mail routing mistakes and problem points. Since each tag 10 is destined to be handled and logged by a particular carrier, if a tag is sent to the wrong carrier, the tag number will not match the tag number expected for that route. In a preferred form of the invention, the data analyzed by system 30 can be accessed through a web interface 35 by remote users on computers 36 using report generation software. Steps of the method as indicated by arrows in FIGS. 2-3 include a) receiving a tag for use at originating P7DC 20, typically from the delivery unit 26, b) shipping and scanning tags at one or more intermediate destinations, such as while on board truck 23 when it is at a stopping point, c) scanning with the IMD 32 to stop timing for the current cycle and d) recording the starting time for the next cycle, at which point the cycle repeats.

Although the standard format of the IMB includes the destination zip code, the routing of the tag mail piece 10 is not defined within its IMB. This feature is necessary to allow dynamic destinations to be assigned a tag mail piece to accommodate the sequential processing loops and multiple destinations that each tag mail piece encounters. Thus the system 30 is in two-way communication with sorting machines 31 so that when a destination for a tag I.D. is changed by system 30, a new zip code is associated with that tag I.D. when it is sorted for the next cycle.

The IMB used in the tag mail piece will be associated with a default delivery point defined by the postal service (e.g., a warehouse) that acts as a failsafe when dynamic delivery points cannot be calculated for whatever reason. The remaining data components of the IMB are used as a serial number to render the code unique, providing a license plate function. As tag mail pieces are sorted within the postal logistic, the various reading and sorting systems within the logistic would be altered to screen for the IMB containing the zip code assigned to all tag mail pieces 10 and sort accordingly.

Mail Processing Equipment (MPE) continuously screens for the specified zip code or ID code embedded in the IMB that indicates a tag mail piece. When a tag mail piece has been detected, the mail processing equipment 31 queries a server (Server 30) for the appropriate delivery point assignment for that tag mail piece. While the system would, in general, retain the same delivery point destination for each tag mail piece in a given cycle, it would be possible for the system to reassign and redirect tag mail pieces when necessary to meet area testing requirements.

The system of the invention can exercise several levels of test methodology in the control of the routing through which tag mal pieces navigate the system. The most basic, highest level method is a simple, essentially random pairing of sectional center facilities in a test scenario. The actual test in such an SCF to SCF scenario would, of course, encompass DU's and carriers beyond the SCF, but the principal focus of this high-level test methodology would be testing the performance of the SCF pair. It is determined how well mail proceeds from one SCF to another and is then delivered to recipients in the zone served by the second facility. In another example, a batch of markers (tags) at SCF#1 are designated for delivery to delivery points served by the paired SCF#2, and a batch of tags at SCF#2 are designated for delivery to delivery points served by SCF#1. The statistics can be compared: does it take the same amount of time to send an item between points A and B in either direction? Transit time between P&DC's is measured and compared by scanning of a tag on departure and arrival at each SCF.

At a second, more detailed level, specific performance problems are explored by initiating tests to circulate tag mail pieces in areas where problems have either been detected or reported. It is envisioned that the second level would be initiated automatically by the system when predetermined criteria applied by the control computer are met, which criteria indicate a specific problem exists. For example, tags circulated to a certain zip code disappear (are lost) from the system more than average, but failure by carriers is not indicated. Scanning for the tags at more frequent check points may indicate where the loss of tags is occurring. The second stage review shows that one sorting machine at an SCF loses an abnormal number of tags. These may have been damaged when passing through the machine.

At a third level, the system would specify targeted scenarios exploring the validated and characterized performance problem using a GPS system such as a Siemens Global Positioning System-enabled test letter to collect data that would support careful analysis of the problem, i.e. it can be determined where a tag mail piece is at a given time and the information compared to tag scan times according to the cycle a)-d) above.

Using a hierarchical test structure, the total number of Tag cards can be greatly reduced. The total number of tag mail pieces required in the system is driven by the permutations in SCF to SCF pairing, the desired duration over the course of which the entire system will have been subject to testing, and the number of problems present in the system. According to the parameters, the system manages the total tag mail pieces required and where those tag mail pieces need to be at any given time. The system of the invention also monitors the total number of cycles each tag mail piece completes, so that worn out tag mail pieces can be automatically removed from the system and replenished with the correct number of replacement tags.

Assuming a 5% coverage (5% of the carriers nationwide would get at least one tag mail piece), the total number of tag mail pieces required is relatively low, and the rate at which any given carrier has the slight added labor of scanning a tag mail piece would be very low. With a manageable number of tag mail pieces, it is possible to include a range of value-added enhancements. Preferably from 1% to 5% of all carriers in the postal system get at least one tag mail piece per cycle, assuming the testing is conducted more or less evenly over the entire postal system. Frequency of testing depends on the need for improvement in the system and/or the need to follow up on the results of previous tests. One nationwide cycle per month may be sufficient.

Figure 4:
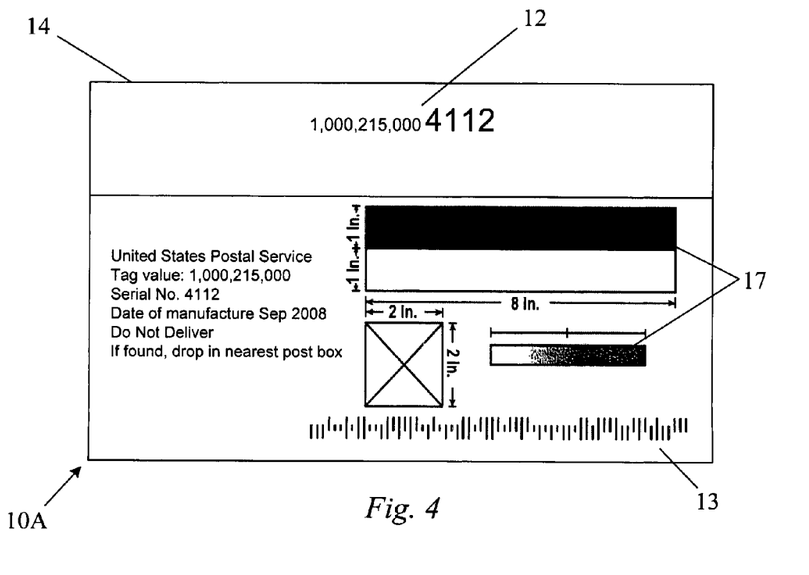
FIGS. 4 and 5 show enhanced tag mail pieces according to the invention.
Figure 5:
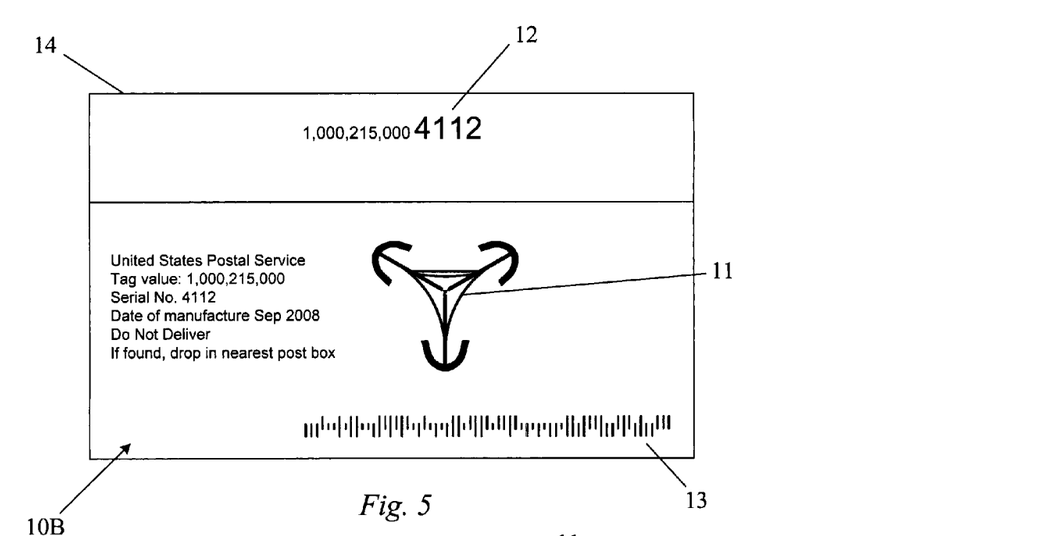

FIGS. 4 and 5 show two enhancements to a tag mail piece. In the first example, a tag mail piece 10A has graphical features 17 printed on its face, which could be used to determine the functionality of the mail sortation scanning system. The detection of the tag mail piece 10A initiates algorithms to analyze the test patterns printed on the tag mail piece 10A, and sequential tag mail piece scans indicating similar problems could initiate maintenance on the scanner.

In a second example of a tag mail piece 10B, in the tag forefront, the tag mail piece 10B includes an RFID tag 11 for use as described in the Redford patent publication cited above. This enhancement provides the basis for leveraging the tag mail pieces, along with RFID gateways, to provide tracking outside of the basic mail processing equipment scanning of IMB's. This adds additional data points for tracking within the facility, and could even aid in the online detection of misrouted all-purpose carriers.

A further enhancement not shown in FIGS. 4-5 involves increasing the ruggedness of the tag mail pieces to increase their service life. The budget for enhanced ruggedness would be a straightforward return on investment determination. Tags 10, 10A and 10B are created using a material such as paper card stock. It is important that the tag be low cost and capable of being processed in sorting operations many times. The nature of sorting tends to destroy the document when subjected to multiple sort runs primarily due to the impact of the mail against a physical stop in the sorter pocket. The mail is typically traveling at 4 meters/second and most sorting systems do not decelerate the mail piece before it impacts the stop. In the present invention physical handling by the carriers is also a wear factor.

The improved tag marker document can be constructed of plastic but this would cost several times the cost of a paper-based document. Tests have shown that a good quality paper card stock document will last 10-15 sorts. Treating the leading edge of the card stock with a plastic layer such as tape can increase the number of sorts possible to over one hundred because the resulting edge is resistant to damage from the impact in the sorter pocket.

Figure 6:
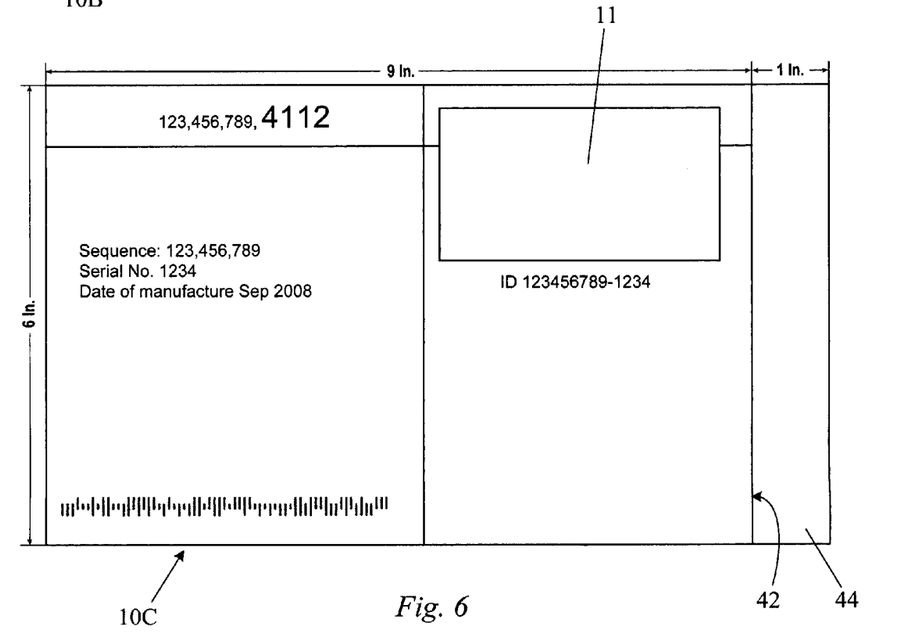
FIG. 6 shows a wear protected tag mail piece according to the invention.

In an improved durability tag 10C according to the invention, an optional RFID tag 11 such as the Avery Dennison AD-222 is often sent to a qualified converter where the tag is applied to an adhesive backing creating a label. To create the tag marker document, the card is printed with the needed bar code(s) and other information, and the label affixed using the adhesive plastic backing. Plastic tape can be applied in a third step to protect the front edge.

Figure 7:
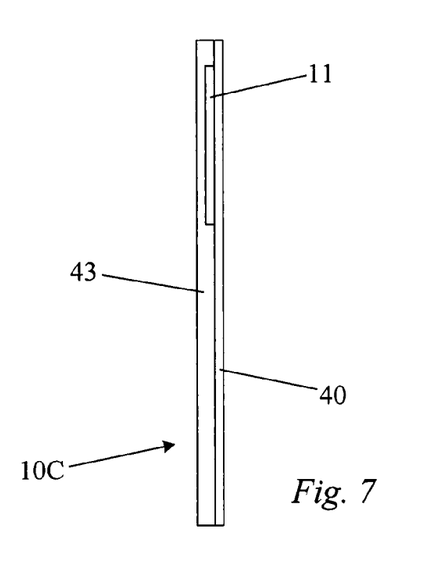
FIG. 7 is a leading edge-on view of the tag mail piece of FIG. 6.
Figure 8:
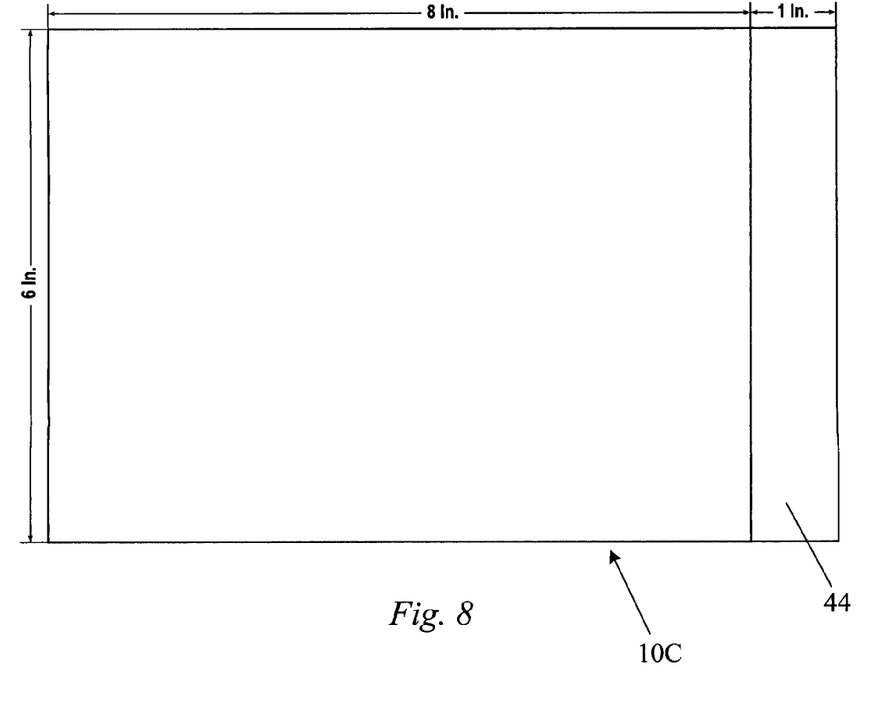
FIG. 8 is a rear view of the tag mail piece of FIG. 6 with the flap folded.

Application of the RFID label to the tag marker document and protection of the leading edge can be accomplished in a single step. The RFID tag is 11 affixed to an adhesive plastic sheet or substrate 40 that is sufficient to cover the tag marker leading edge 42 from top to bottom. The sheet 40 is wide enough to cover the underlying rectangular piece of card stock 43 and provide an inch of plastic material as a flap 44 to be folded over the leading edge 42. The resulting tag 10C has improved durability during sorting and thus can be used in the present invention even without the RFID tag functions described in Redford US patent publication 20090048704. It may be sufficient, for example, to cover at least one side of the leading edge 42 with a stripe of adhesive tape, preferably transparent plastic tape.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention. Such modifications are within the scope of the invention as expressed in the appended claims.

The invention claimed is:

1. A method for tracking postal service performance using a computerized tracking system and tag mail pieces having machine readable indicia indicating an identification code for each tag mail piece, comprising:
   assigning delivery destinations to each tag mail piece using the computerized tracking system by querying a server with the identification code, wherein each tag mail piece is not marked with a delivery destination;
   at an originating postal facility, sorting the tag mail pieces on postal mail sorting machines according to a sort scheme whereby the tag mail pieces are each grouped with mail addressed to the delivery destinations assigned to the grouped tag mail pieces;
   transporting the groups of mail grouped with tag mail pieces to a destinating postal facility;
   scanning each tag mail piece to determine date and time of arrival of each tag mail piece at a series of locations, which scanning is carried out at multiple locations to determine transit times between locations for each tag mail piece, wherein the multiple locations include the originating postal facility, the destinating postal facility, and the delivery destinations, wherein the tag mail pieces are scanned at the delivery destinations without being delivered to the delivery destinations;
   returning the tag mail pieces from the delivery destinations to a postal facility which may be the same or different from the originating postal facility in the assigning step;
   re-assigning the returned tag mail pieces to different delivery destinations to determine transit times between different locations; and
   analyzing tag arrival data from the scanning step using the computerized tracking system programmed to identify tag arrival data associated with postal performance problems.

2. The method of claim 1, wherein the tag mail pieces are scanned at delivery destinations at an end of one cycle and at a start of a next cycle where the tag mail pieces are returned.

3. The method of claim 1, wherein performance tracking is conducted on a pair of first and second mail facilities at different geographic locations, wherein the first mail facility serves as originating mail facility for mail and tag mail pieces transported to the second mail facility as destinating mail facility, and
   wherein the second mail facility serves as originating mail facility for mail and tag mail pieces transported to the first mail facility as destinating mail facility.

4. The method of claim 1, wherein the tag mail pieces include a first tag mail piece that is assigned to be delivered to a first delivery destination, transported the first delivery destination, scanned at the first delivery destination, not delivered to a recipient at the first delivery destinations, and repeatedly re-assigned to be delivered to and returned from subsequent different delivery destinations.

5. The method of claim 1, wherein assigning the delivery destinations to each tag mail piece comprises:
   identifying a geological area where delivery problems have been reported; and
   assigning delivery destinations in the geological area to a number of the tag mail pieces.

6. The method of claim 1, wherein analyzing the tag arrival data from the scanning step comprises:
   determining whether a tag mail piece was scanned at a delivery location assigned to the tag mail piece.

7. The method of claim 1, wherein the tag mail pieces resemble an actual piece of mail but are not an actual piece of mail for a recipient mail customer and are not intended to be delivered to a recipient mail customer at any point, wherein one or more of the tag mail pieces comprise a card covered by a plastic material.

8. The method of claim 7, wherein one or more of the tag mail pieces comprise a radio frequency identifier (RFID) tag.

9. A system for tracking postal service performance, comprising:
   a plurality of tag mail pieces each bearing a machine readable identification code and not bearing a delivery destination;
   a computerized tracking system configured
      to maintain a database of tracking data which reflects when each tag mail piece was scanned during a postal delivery cycle, which the computerized tracking system receives tracking data from postal mail sorting machines which scan the tag mail pieces and from manual scanning devices used to scan the tag mail pieces during postal delivery;
      to assign delivery destinations to each tag mail piece by querying a server with the identification code, wherein the tag mail pieces are scanned at the delivery destinations and then returned for reassignment without being delivered to the delivery destinations; and
      to re-assign the returned tag mail pieces to different delivery destinations to determine transit times between different locations;
   a communications system configured to receive the tracking data from the postal sorting machines and the manual scanning devices; and
   an automated analyzer configured to identify tag arrival data associated with postal performance problems.

10. The system of claim 9, wherein the tag mail pieces include a first tag mail piece that is assigned to be delivered to a first delivery destination, transported the first delivery destination, scanned at the first delivery destination, not delivered to a recipient at the first delivery destinations, and repeatedly re-assigned to be delivered to and returned from subsequent different delivery destinations.

11. The system of claim 9, wherein the tag mail pieces resemble an actual piece of mail but are not an actual piece of mail for a recipient mail customer and are not intended to be delivered to a recipient mail customer at any point, wherein one or more of the tag mail pieces comprise a card covered by a plastic material.

12. The system of claim 11, wherein one or more of the tag mail pieces comprise a radio frequency identifier (RFID) tag.

* * * * *